Feb. 6, 1951     E. P. BULLARD ET AL     2,540,186
MACHINE TOOL Filed Sept. 29, 1944     8 Sheets-Sheet 3

Fig. 9

Feb. 6, 1951 E. P. BULLARD ET AL 2,540,186
MACHINE TOOL
Filed Sept. 29, 1944 8 Sheets-Sheet 7

INVENTORS
EDWARD P. BULLARD, EDWARD P. BULLARD III,
GUSTAF R. APPELBERG, ERIC G. BJORKLUND,
EDWARD N. COWELL, CLAUDE H. GRINAGE,
ERNEST H. JOHNSON, PAUL H. LANGE,
FRANK H. MUSSLER
BY
ATTORNEY

Patented Feb. 6, 1951

2,540,186

UNITED STATES PATENT OFFICE 2,540,186

MACHINE TOOL

Edward P. Bullard and Edward P. Bullard, III, Fairfield, Gustaf R. Appelberg and Eric G. Bjorklund, Bridgeport, Edward N. Cowell, Stratford, Claude M. Grinage, Ernest H. Johnson and Paul H. Lange, Bridgeport, and Frank H. Mussler, Stratford, Conn., assignors to The Bullard Company, a corporation of Connecticut Application September 29, 1944, Serial No. 556,450

7 Claims. (Cl. 29—38)

This invention relates to machine tools, and particularly to a multiple-spindle lathe of the type that includes a plurality of work-supporting spindles mounted in a carrier that is indexed about a central column.

Multiple-spindle lathes have heretofore primarily been employed to produce in mass volumes, the so-called small parts of engines and machines. The large parts of such machines such as the crank cases, engine blocks and others, were usually produced in sufficient quantities on single spindle machines.

Multiple-spindle lathes of the above type included a swing that seldom exceeded sixteen inches, although a few were built that included a swing of twenty-three inches. Due to present-day demands, a great need is felt for a machine that will produce the so-called large parts of airplane engines, as well as the large parts of other machines as rapidly as the so-called small parts are produced.

Prior-known multiple-spindle lathes were usually built with central columns having different distances between the one end of the tool slide bearings and the carrier that contained the work-supporting spindles. Machining relatively tall work required a substantial distance between these parts so that the slide bearings would not interfere with the work during indexing of the carrier. To perform machining operations on low elevation work on the same machine provided an excessive overhang of the tool slides relatively to the slide bearings on the central column.

The principal object of this invention is to provide a multiple-spindle lathe having a swing sufficient to accommodate the so-called large parts of machines, and designed to incorporate features necessary to the proper machining of such parts.

Other objects include the provision of such a multiple-spindle machine tool having an adjustable central column for supporting the lathe tools for both high and low work such that excessive tool overhang is not encountered; the provision of such a lathe in which a separate auxiliary drive is provided at the loading station for facilitating loading and checking work measurements; the provision of such a lathe in which a plurality of tool supports is employed at each work station and a separate feedworks transmission is provided for each tool support; the provision of such a lathe in which the work-supporting carrier is indexed only when all tool heads have moved to a specific position and common releasing means is provided between the feedworks of any station and its tool supports; the provision of such a lathe including a constant-speed driving means for indexing the work-supporting carrier such that its maximum tangential velocity never exceeds the tangential velocity of the driving means; the provision of such a lathe including separate change-speed gearing at each station for the work-supporting spindles and comprising dual range driving means that is operated by hydraulic mechanism; the provision of such a lathe in which mechanism is provided for locking the work-supporting carrier at exactly the correct place about its central column by any required power and independently of the mechanism that indexes the carrier; and the provision of such a lathe including a forming head for a tool for effecting contour turning through the cooperation of one of the feedworks.

The above, as well as other objects and novel features of the invention will become apparent from a consideration of the following specification and the accompanying drawings wherein.

Figure 1:
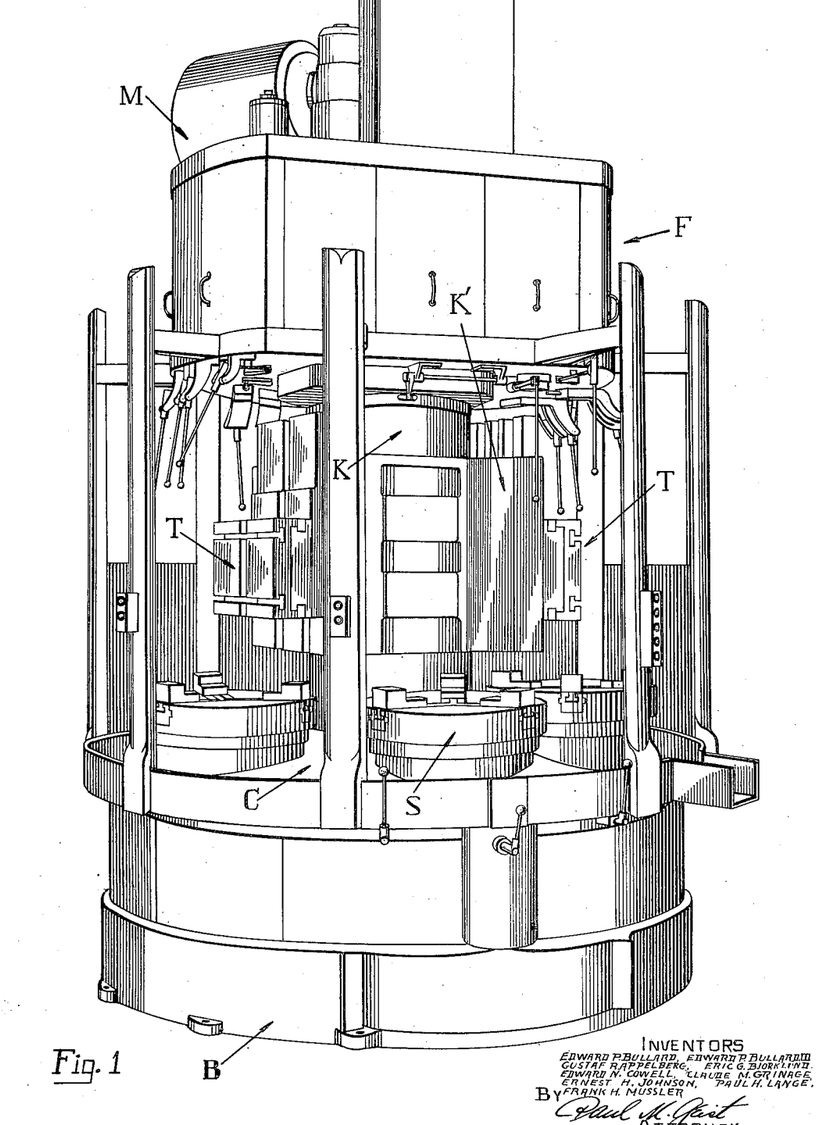
Figure 1 is a perspective view of a multiple-spindle lathe to which the principles of this invention have been applied.
Figure 2:
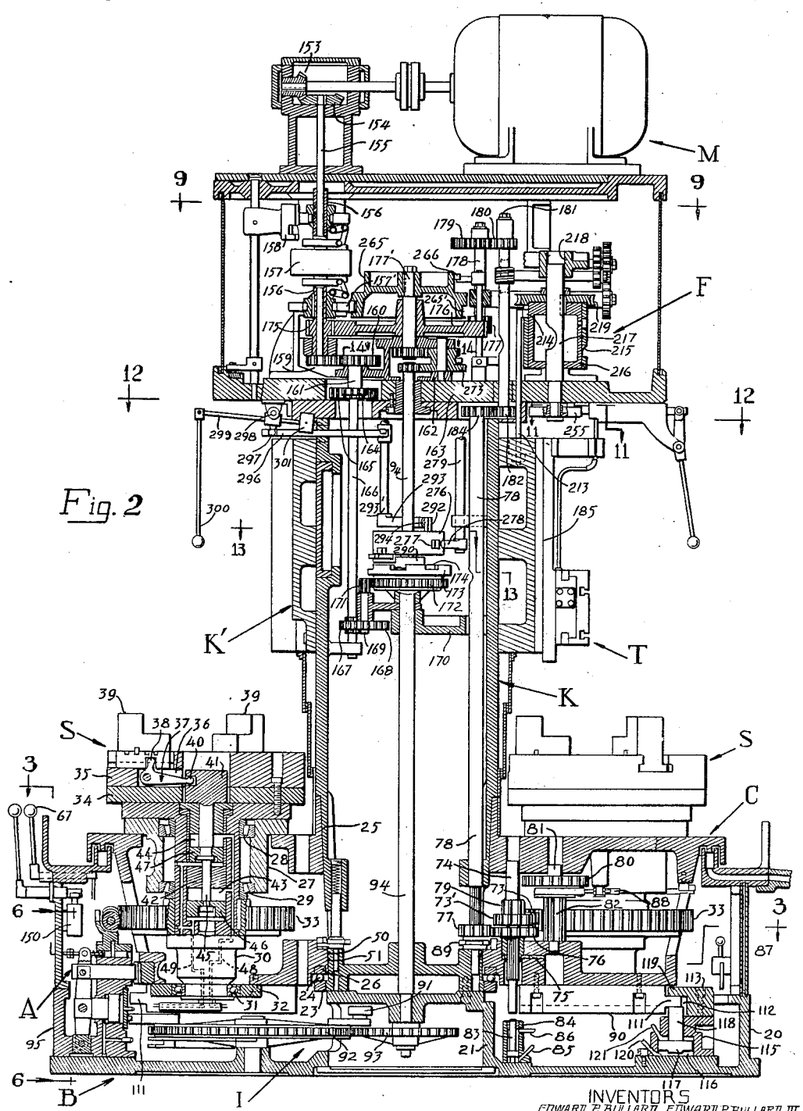
Figure 2 is a sectional-elevational view of the apparatus shown in Fig. 1.

Referring to the drawings, particularly Figs. 1 and 2, the invention is shown as applied to a multiple-spindle lathe including a base B to which is secured a vertically-disposed column K that journals an annular-shaped carrier C on its lower end. A plurality of work-supporting spindles S is mounted on the carrier C in a circle about the column K. The column K includes an adjustable portion K' of generally rectangular cross-section providing four stations about the column. Three of these stations include tool supports T adapted to be moved vertically and horizontally relatively to the supports S. The fourth station is the work-loading station and at which no tool support is provided. Each tool support is provided with a separate feedworks F that receives rotary power from a motor M that also supplies power for rotating supports S, as well as for operating an indexing mechanism I successively to index the carrier C from station to station. An auxiliary driving mechanism A is provided at the loading station for facilitating the chucking of the work to the supports S.

The base B comprises a generally cylindrical housing 20 containing a centrally-disposed upstanding boss 21, forming a seat to which is bolted the column K of substantially tubular form. The lower end of the column K threadingly receives the lower race 23 of a ball bearing 24, and includes a tapered bearing portion 25. The carrier C is of generally annular shape, the inner periphery of which is journaled on the tapered bearing 25. The lower face of the carrier C is provided with the upper race-way 26 of the ball bearing 24 upon which the carrier rests. The four work-supports S that are mounted on the carrier C are identical and, therefore, only one will be described. Its assembly includes a spindle 30 held within a cored opening in the carrier by a flanged cylinder 27 including upper and lower anti-friction bearings 28 and 29. The lower end of the spindle 30 is reduced in diameter and is journaled within an anti-friction radial thrust bearing 31 mounted within a plate 32 fixed to the lower face, and overlying the cored opening of the carrier C. A driving gear 33 is keyed to the spindle 30 for transmitting rotary power thereto by means which will be described later. Chucking mechanism is adapted to be attached to the spindle 30 and it includes a plate 34 on which is mounted a work-supporting table 35, rigidly fixed with the member 34 to the top of the spindle 30. The table 35 is provided with recesses 36 within which bell cranks 37 are arranged for slight movement relatively thereto. The bell crank 37 includes an arm 38 that cooperates with a chuck jaw 39, and an arm 40 that cooperates with a head 41 of a piston rod 45 reciprocable along the axis of rotation of the work-supporting table 35. There are three jaw members 39 for each spindle S and accordingly, there are three bell cranks 37, each of which engages one of the jaws 39 and all of which cooperate with the reciprocable head 41. Upward movement of the head 41, as viewed in Fig. 2, causes the jaws 39 to move outwardly from the axis of the work-supporting table 35; and downward movement of the head 41 causes inward movement of the jaws 39.

The spindle 30 is provided with a recess having a partition 42 that divides it into two cylindrical portions 43 and 44. The rod 45 extends downwardly through the partition 42 and supports tandem arranged pistons 46 and 47 within cylinders 43 and 44. Fluid under pressure admitted to a line 48 in the lower end of the spindle 30 causes downward movement of the pistons 46 and 47, thereby effecting inward movement of the jaws 39. Fluid under pressure supplied to a conduit 49 within the lower end of the spindle 30 causes upward movement of the pistons 46 and 47 and thereby outward movement of the jaws 39. Fluid under pressure is adapted to be supplied to the conduits 48 and 49 from two grooves 50, 51 between the lower end of the surface 25 of column K and the carrier C.

Figures 3, 4, 5:
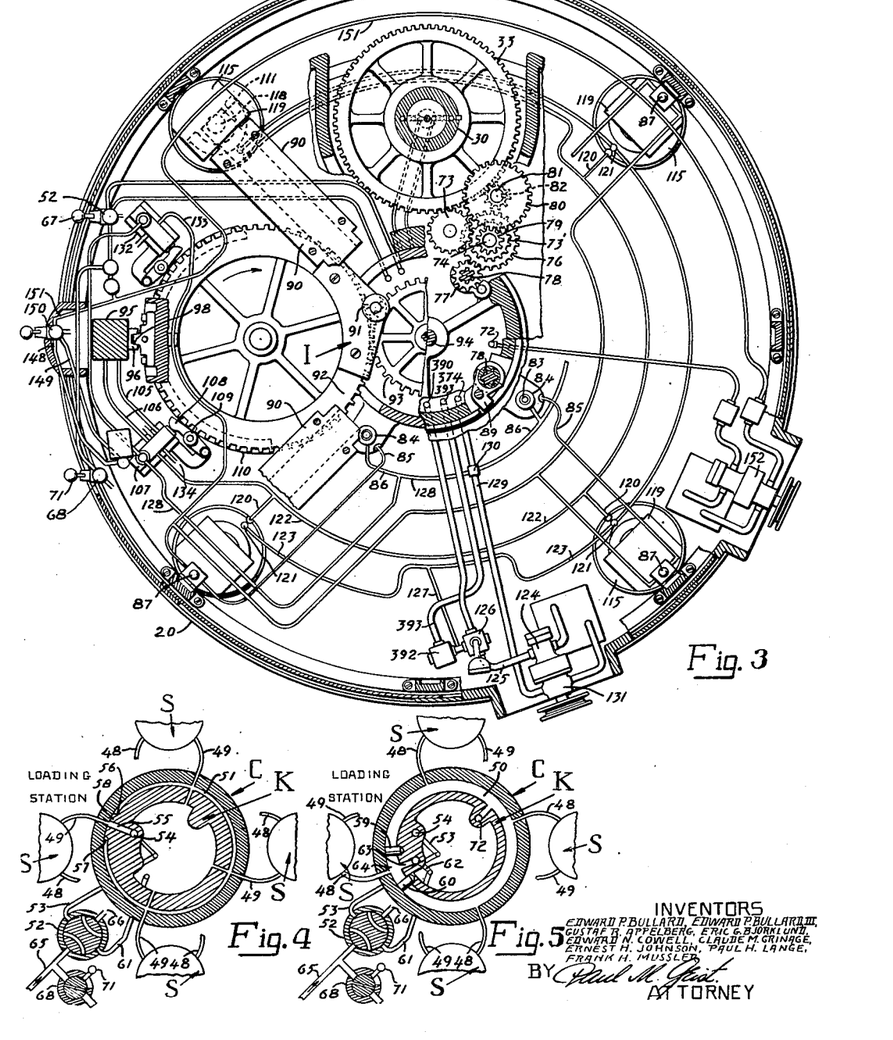
Figure 3 is a sectional-plan view taken substantially along the irregular line 3—3 of Fig. 2, certain parts being omitted and certain parts broken away to show others.
Figures 4 and 5 are detail sectional-plan views of the hydraulic circuit for the hydraulic chuck mechanisms.

The fluid under pressure for conduits 48 and 49 when the spindles S are located at the loading station must be separate from that supplied to said conduits while the spindles are at the work stations. Referring to Figs. 3, 4 and 5, wherein a diagrammatic showing is provided illustrating the hydraulic chuck-operating system, a source of fluid under pressure is adapted to be controlled by a two-way valve 52 from which a duct 53 leads to a passage 54 within the non-rotatable column K. The passage 54 communicates with a radial passage 55 that extends outwardly to the periphery of the column K. The groove 51 extends about the periphery of the column K from a point 56 to a point 57 on each side of a boss 58 through which the radial passage 55 extends. The groove 50, at a different elevation from that of groove 51, extends about the column K from a block 59 to a block 60, both of which blocks are fixed in column K and form a sliding seal with carrier C. Another conduit 61 extends from the valve 52 to a point within the column K. It is connected to a conduit 62 (Fig. 5) that is in communication with a passage 63 opening into a space 64 between the two blocks 59 and 60. The conduits 49 of the piston mechanisms for the various spindles are connected to the rotatable carrier C and extend therethrough to the inner peripheral surface thereof. Upon indexing the carrier C from station to station, conduits 49 successively become aligned with the passage 55 within the column K. The conduits 48 of said piston mechanisms are connected to the carrier C and extend therethrough to the inner peripheral surface thereof at an elevation such that they communicate with the groove 50. With the parts in the position shown in Figs. 4 and 5, clockwise movement of the valve 52 will cause fluid under pressure to flow from a line 65 to the line 53, thence to the passages 54, 55, and conduit 49, thereby causing the upward movement of the pistons 46 and 47 and the opening of the jaws 39 of the spindle S located at the loading station. The conduit 48 (Fig. 5) of the spindle S at the loading station is in communication with the chamber 64 and exhausts through lines 63, 62, 61 to an exhaust port 66. Counter clockwise movement of the valve 52 will cause fluid under pressure to flow through the line 65 to lines 61, 62, passage 63, chamber 64, conduit 48, causing the downward movement of the pistons 46 and 47 and thereby the inward movement of the jaws 39 of the spindle S at the loading station. The portion of the cylinders below pistons 46 and 47 exhaust through line 49, passage 55, lines 54, 53 and exhaust port 66. The valve 52 is operated by a hand lever 67 (Fig. 2). An additional two-way valve 68 is provided in a branch leading from the line 65. High pressure is adapted to be supplied through line 65 when valve 68 is closed. Opening valve 68 reduces the pressure in line 65 to a relatively low value. The valve 68 is adapted to be operated by a hand lever 71 (Fig. 3). The purpose of the high and low pressure for chucking at the loading station is to enable proper setting of the work with gauges prior to indexing the work to the first working station.

The conduits 49 of the remaining three spindle mechanisms S at the working stations are in communication with the groove 51 which exhausts through radial passages into the interior of the stationary column K. The conduits 48 of these three last-mentioned spindles S are in communication with the groove 50 which is supplied with fluid under constant pressure from a conduit 72 that leads to a source to be described later. Accordingly, the 'jaws 39 of these last-mentioned three spindle mechanisms are maintained in their inward positions rigidly chucking the work at the operating stations about the column K.

The gear 33 keyed to the spindle 30 is in mesh with a pinion 73 (Figs. 2 and 3) that meshes with another gear 73' keyed to a shaft 74 that is mounted for vertical reciprocable movement in the carrier C. The shaft 74 has a splined lower portion that extends through a sleeve gear 76 journaled in the carrier C. A screw 75 retains sleeve gear 76 against upward movement while permitting it to rotate. Gear 76 meshes with a gear 77 fixed to a vertically-disposed shaft 78. Rotation of the shaft 78, therefore, causes rotation of the spindle S through the gear train 77, 76, 73', 73 and 33 (Fig. 3). The gear 73' is one of a cluster including a gear 79 adapted to mesh with a gear 80 fixed to a stud 81 journaled in the carrier C. Another gear 82 is keyed to the stud 81 and meshes with the gear 33. Accordingly, vertical upward movement of the shaft 74 causes vertical upward movement of the gears 73', 79 such that the gear 73' moves out of mesh with gear 73, and gear 79 moves into mesh with gear 80. Accordingly, when this occurs, the spindle S is rotated at a much slower rate by the rotation of shaft 78 through the gear train 77, 76, 79, 80, 82 and 33. Vertically-upward movement of the shaft 74 is effected by the action of a plunger 83. The plunger 83 is mounted within a cylinder 84 to which a conduit 85 is connected and through which a supply of fluid under pressure is adapted to be directed to the under surface of the plunger 83, while constant pressure is adapted to be supplied to the upper surface of the plunger 83 through a conduit 86. The effective area of the under surface of the plunger 83 is much greater than that of the upper surface and, consequently, although the constant pressure in the conduit 86 normally urges the plunger 83 downwardly, admission of fluid under pressure to the conduit 85 will cause upward movement of said plunger 83 and the shaft 74. Upon release of the pressure in conduit 85, shaft 74 will descend due to its own weight.

Referring to Fig. 3, there are a cylinder 84 and plunger 83 at each working station about the column K. There is also provided a valve 87 at each station within the base 20 that controls the supply of fluid to the conduit 85. The system for supplying fluid under pressure to the conduits 85 and 86 will be described later.

As previously stated, the carrier C is adapted to be indexed from station to station by the operation of the indexing mechanism I. It is necessary, however, to stop the rotation of the spindles S and to raise gear 77 at the beginning of each indexing motion so that the latter can be lowered into mesh with the gear 76 at the next station. Accordingly, a brake mechanism 88 (Fig. 2) is provided on each shaft 81 that is normally released, but which upon initial indexing movement of the carrier C is rendered effective to stop the rotation of the spindle S in a manner to be described later. Additionally, the gear 77 is splined on the shaft 78 and is provided with a fork and groove connector 89 that is raised by the action of a cam upon the initial indexing of the carrier C. Accordingly, while the gears 77 and 76 can roll out of mesh with each other, the gear 77 is elevated and upon the completion of the indexing movement of the carrier C, gear 77 is permitted to descend into mesh with the gear 76 at the next succeeding station.

In a machine as large as the present machine, the mass of the carrier C including that of the work being machined is a very substantial amount. Accordingly, the indexing of this mass from station to station involves the problem of accelerating and decelerating the carrier during a ninety-degree movement thereof. If this acceleration and deceleration is not controlled, excessive forces are set up which cause slamming and jamming of the entire structure and tend to affect its accuracy. An important feature of this invention is the provision of an indexing mechanism including a crank that is rotated at a constant tangential velocity and which provides a Geneva type motion to the carrier in such manner that the maximum tangential velocity of the carrier will not exceed the constant tangential velocity of the driver. Referring to Figs. 2 and 3, indexing shoes 90 are fixed to the under surface of the carrier C at ninety-degree intervals. The construction of the shoes 90 provides a channel for the reception of a roll 91 mounted on a driving gear 92. By arranging the parts such that the roll 91 engages the shoes 90 at their inner-most portion at the beginning of an indexing cycle and leaves the shoes at the inner-most portion at the end of an indexing cycle, a construction is provided whereby the maximum tangential velocity of the carrier C will not exceed the tangential velocity of the gear 92. The gear 92 is driven by a gear 93 that is keyed to the lower end of a shaft 94 which extends upwardly along the central axis of the column K.

The shaft 94 is adapted to be rotated by the motor M through a train of gears that will be described later. The shaft 94 makes two revolutions to each single revolution of the gear 92, and consequently to the movement of the carrier C from one station to another.

Figures 6, 7:
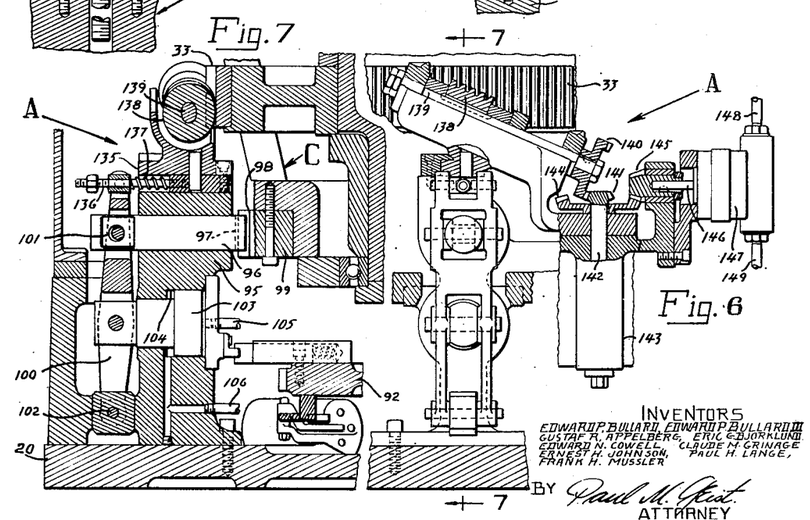
Figure 6 is a sectional-elevational view taken substantially along line 6—6 of Fig. 2.
Figure 7 is a sectional-elevational view taken substantially along line 7—7 of Fig. 6.

The carrier C must be rigidly locked in accurate positions about the column K since the tool heads T must always register accurately with each spindle S when it is indexed from station to station. In the present invention, means has been provided for very accurately locating the carrier C in its four index positions about the column K. Referring to Figs. 2, 6 and 7, a bracket 95 is adapted to support a cylindrical ram 96 that includes a bifurcated end 97, containing tapered surfaces adapted to cooperate with mating tapered surfaces 98 on a plate 99 rigidly fastened to the lower portion of the carrier C. The end of ram 96 opposite that containing the bifurcation is connected to an oscillatable lever 100 through a lost-motion connection 101 to accommodate for the angularity of the oscillatable lever 100. The lever 100 is pivoted at 102 in the bracket 95. Between the pivot 102 and the connection 101, the lever 100 is connected to a piston 103 that is adapted to reciprocate within a cylinder 104 formed in the bracket 95. Fluid under pressure is adapted to be admitted to the cylinder 104 on opposite sides of the piston 103 by conduits 105 and 106 that are connected to a valve 107 (Fig. 3). The valve 107 is adapted to be operated in timed relation with the indexing of the carrier C and, therefore, a pivoted lever 108 is provided containing a roll 109 that is adapted to cooperate with a cam 110 fixed to the gear 92. Referring to Fig. 3, the roll 91 on the gear 92 is shown in its rest position. There is a substantial movement of the roll 91 before it engages one of the shoes 90 on the carrier C. The cam 110 is so adjusted that the valve 107 is actuated to effect outward movement of the ram 96 just prior to the cooperation between roll 91 and a shoe 90. When the carrier C has been indexed from one station to another, the cam 110 again actuates valve 107 to cause ram 96 to move inwardly such that its bifurcated end 97 cooperates with the tapered surfaces of the plate 99 on the carrier C accurately to locate the latter. When the carrier C has accurately been located at its indexed position, means must be provided for rigidly binding the carrier in this accurate location. Referring to Fig. 2, each of the shoes 90 is provided with an outwardly extending tongue 111 that is adapted to pass through a channel 112 formed by a block 113 and a supporting member 115. The supporting member 115 includes a cylinder 116 within which a piston 117 is adapted to be reciprocated. The piston 117 includes a piston rod 118 that extends through an opening in the supporting member 115 and in line with an overhanging portion 119 of the block 113. The construction and arrangement of the parts are such that when the carrier C is located at any station, the tongue 111 of all of the shoes 90 will be located between the piston rod 118 and the overhanging portion 119 of four assemblies including blocks 113 and members 115. Fluid under pressure is adapted to be admitted to the cylinder 116 on each side of the piston 117 through conduits 120 and 121. The conduits 120 and 121 for the four binding mechanisms including the pistons 117 are connected respectively to lines 122 and 123. The line 123 is supplied with liquid under pressure from a pump 124 through a conduit 125, a relief valve 126 and conduit 127. The pressure in line 123 is substantially low pressure for forcing the pistons 117 downwardly when it is desired to release the carrier C for indexing purposes. The line 122 is connected to the valve 107 which is supplied with liquid under high pressure from a conduit 128 that is in turn connected to a conduit 129 by a T-connection 130. The conduit 129 is connected to a pump 131 that is driven by the same prime mover that drives the pump 124. Conduits 86 leading from the cylinders 84 are connected to the conduit 128. An extension of the line 128 beyond the valve 107 is connected to a valve 132. The valve 132 includes a conduit 133 that is in communication with each of the manually-operated valves 87 located at each of the stations about the column K within the base B. The conduits 85 extending from the cylinders 84 are connected to the respective manually-operated valves 87. The construction and arrangement of the parts are such that upon the initial movement of the roll 91 prior to an indexing operation, the valve 107 is operated to cause high pressure liquid to flow from line 128 through line 105, to the cylinder 104 retracting the ram 96, thereby releasing the locating mechanism for the carrier C. This movement of valve 107 causes the exhaust of the conduits 120 through an exhaust port 134 in valve 107, thereby permitting the low pressure fluid from line 127 to pass through conduit 121 to move the binding pistons 117 downwardly, whereupon the carrier is released. Additionally, valve 132 is operated just before roll 91 engages a shoe 90, exhausting line 133 and consequently the conduits 85, thereby permitting the fluid under high pressure from line 128 to force the plungers 83 downwardly, whereupon any of the shafts 74 that have been raised are permitted to descend due to their own weight.

At the completion of an indexing movement, the valve 107 is again operated to cause pressure liquid to flow through the conduit 106, thereby moving the ram 96 inwardly such that its bifurcated end cooperates with the tapered surfaces 98 to accurately locate the carrier C. At the same time, the operation of valve 107 causes the flow of liquid under pressure from line 128 to pass through the line 122, thence through the conduits 120 forcing the pistons 117 upwardly, thereby locking the carrier C in its indexed position. Additionally, when an index has been completed, the valve 132 is operated to supply liquid under pressure from line 128 through the line 133 to each of the valves 87, and beyond any of said valves which are open to permit fluid to flow to the conduits 85 leading to the cylinders 84.

The auxiliary driving mechanism A for the spindles S is located at the loading station and comprises a reciprocable member 135 (Fig. 7) mounted on the top of support 95 and operable as a cross head. The cross head 135 is connected to the top of the oscillatable lever 100 by a rod 136 that is fixed at one end to the cross head 135 and which extends through an opening in the top of the lever 100. A spring 137 between the lever 100 and the cross head 135 forms a resilient connection for a purpose to be described later. The cross head 135 is adapted to support a worm 138 on a shaft 139. The shaft 139 is provided with a bevel gear 140 keyed to its lower end in mesh with a mating bevel gear 141 integral with a shaft 142 journaled in a bearing 143 of the cross head 135. An additional bevel gear 144, keyed to the shaft 142 is adapted to mesh with a bevel gear 145 that is in turn keyed to a shaft 146 of a reversible fluid motor 147. Fluid is adapted to be supplied to the motor 147 through conduits 148 and 149 which latter are connected to a hand-operated reversing valve 150 (Fig. 3) supplied with pressure fluid from a line 151 leading from a pump 152. Operation of the reversing valve 150 will cause rotation of the pump 147 in either direction to effect rotation of the worm 138 in either direction. The construction and arrangement of the parts are such that upon the completion of any index movement of the carrier C, movement of the piston 103 to effect inward movement of the ram 96 to locate the carrier will move the worm 138 into mesh with gear 33 at the loading station. Should the teeth of the worm 138 land on the teeth of the gear 33, spring 137 will yield and upon operation of the valve 150, proper meshing between the worm 138 and the gear 33 will instantly occur. This construction provides means whereby the operator can cause the controlled rotation of the work spindle S at the loading station to facilitate loading and setting of the work.

Referring to Fig. 2, both the shafts 78 and 94 are adapted to be rotated by the motor M, the former continuously and the latter intermittently only when an indexing operation is to be effected. The motor M is adapted to drive a bevel gear 153 that meshes with a bevel gear 154 fixed to a vertically-disposed shaft 155. The shaft 155 extends downwardly through a sleeve 156 that is adapted to be driven by a main clutch 157. The clutch 157 is adapted to be operated through toggle joints controlled by the oscillation of a cam 158 in a manner to be described later. The shaft 155 is provided with a gear 159 in mesh with a gear 160 fixed to a sleeve 161 that is journaled in a bracket 162 mounted on a plate 163 attached to the top of the column K. The sleeve 161 is provided with a spur gear 164 at its lower end that meshes with a pinion 165 fixed to a vertically-disposed shaft 166. A spur gear 167 is keyed to the lower end of the shaft 166 and meshes with a gear 168 fixed to a stub shaft 169. The shaft 169 is journaled in a bracket 170 integral with the column K, and supports a gear 171 at its upper end in mesh with a gear 172 journaled on the shaft 94. The gear 172 is provided with an upwardly extending cylindrical portion 173 having a plurality of peripherally-arranged slots 174 for a purpose to be described later. From the foregoing, it is evident that so long as motor M is rotating, shaft 155 is rotated, and the gear 172 and cylindrical portion 173 constantly rotate. The shaft 94 is adapted to be connected to and disconnected from the continuously rotating gear 172 for causing the indexing of the carrier C through the mechanism I by means to be described later. The sleeve 156 includes a gear 175 that meshes with a relatively large gear 176 journaled for free rotation on a shaft 177' that is in line with the shaft 94. The relatively large gear 176 is adapted to mesh with six gears 177 (Fig. 8) located at the three work stations about the column K. The gear 177 is keyed to a vertically-disposed shaft 178, to the upper end of which is fixed a gear 179. The gear 179 meshes with a gear 180 keyed to a shaft 181 that extends downwardly and is journaled in the plate 163 located at the top of column K. At the lower end of shaft 181, a spur gear 182 is keyed which meshes with an idle gear 183 (Fig. 8), and which in turn meshes with a gear 184 keyed to the shaft 78. The shafts 78, one at each of the work stations about the column K, are continuously rotated when the main clutch 157 is engaged and the motor M is rotating. The gears 179 and 180 are pull gears and, therefore, the speed at which shaft 78 is rotated may be varied by substituting different diameter gears on the shafts 178 and 181.

Figure 12:
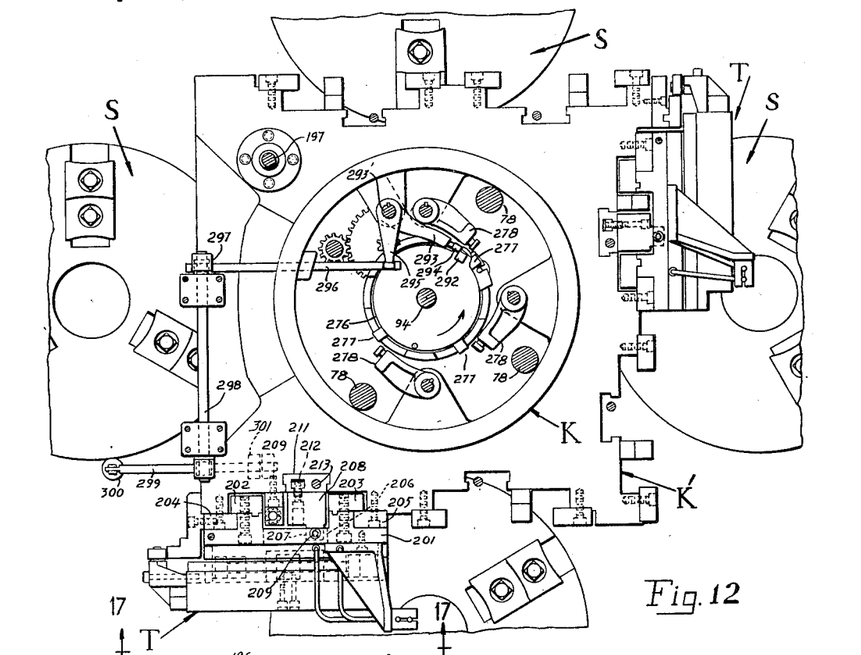
Figure 12 is a top plan view taken substantially along line 12—12 of Fig. 2.
Figure 13:
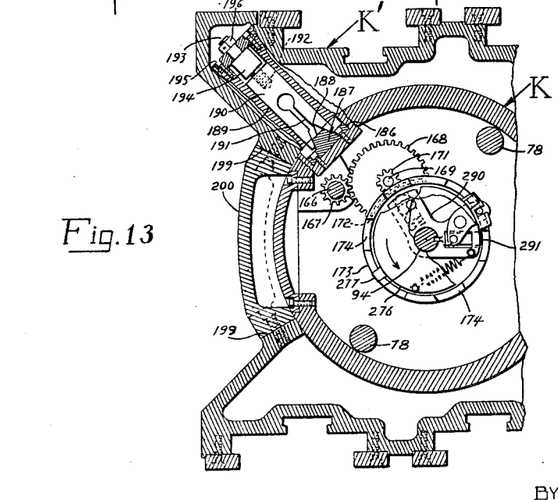
Figure 13 is a partial sectional-plan view taken substantially along line 13—13 of Fig. 2.
Figures 15, 16:
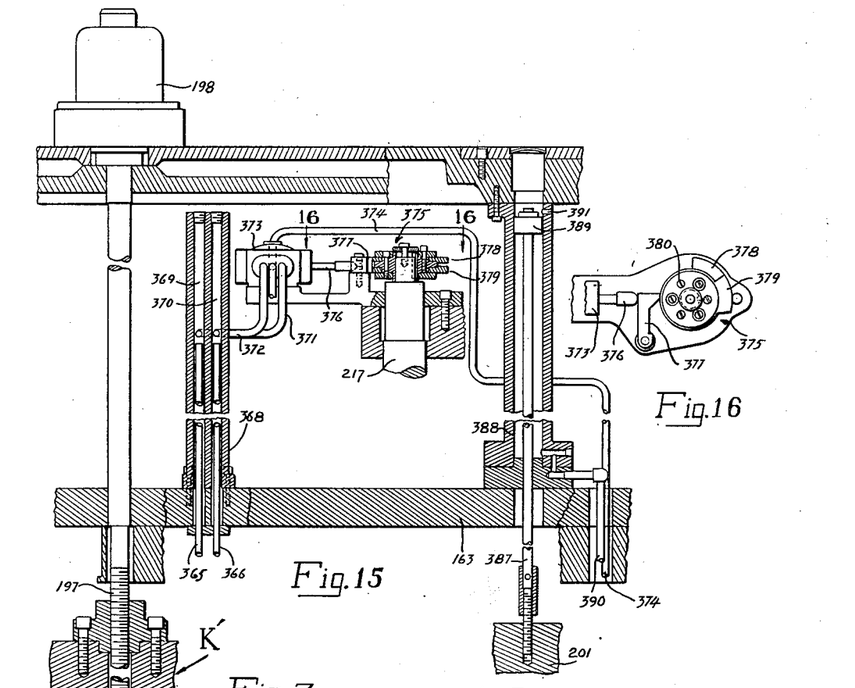
Figure 15 is a sectional-elevational view taken substantially along irregular lines 15—15 of Fig. 9.
Figure 16 is a top plan view along line 16—16 of Fig. 15.

The diameter of the circle surrounding the column K on the carrier C that includes the axes of the spindles S should be as small as possible consistent with the swing of the work-supports S. This is necessary so that excessive tool overhang will not be encountered when tools are fixed to the supports T. In other words, the distance from the tool attached to the support T to the adjustable portion K' must be maintained as small as possible for the sake of rigidity and accuracy. The tool heads T, as previously described, are movable vertically toward and from the supports S. Accordingly, slide bearings are required to support the heads T as closely to the point of tool engagement with the work as is possible, otherwise excessive tool overhang in another direction will be encountered. If the slide bearings are formed rigidly on the column K, the machine is capable of operating only on work, the height of which will not interfere with the lower ends thereof during indexing of the carrier. This means, therefore, that a machine having such slide bearings for machining low elevation work is not usable to machine high elevation work because the high work will interfere, during indexing of the carrier, with the slide bearings on the column that are necessary for the low elevation work. The present invention overcomes this difficulty by providing an adjustable portion K' having an internal surface of cylindrical contour adapted to fit the cylindrical surface of the column K. The outer periphery of the portion K' is of square cross-section providing four relatively flat surfaces, one for each of the stations about the column K. Three of these flat surfaces of the portion K' include slide bearings 185 for receiving the slides T. The fourth surface, at the loading station, contains no tool head. The portion K' must, of course, be rigidly fixed to the column K in any of its adjusted positions and it must be securely held against rotary motion relatively thereto. Referring to Fig. 13, the column K is provided with an elongated recess 186 that receives a plate 187 having a vertically-disposed ridge 188 including tapered sides. The portion K' is provided with a radially-disposed bore 189 adapted to receive a plunger 190, the forward end of which is provided with an elongated slot 191 forming a bifurcated end having tapering surfaces that match with the tapering surfaces of the ridge 188. The end of the plunger 190 opposite the bifurcated end portion includes a threaded recess 192 adapted to receive the threaded end of a bolt device 193. The bolt device includes an enlarged shank portion 194 that is adapted to abut against a cap plate 195 covering the outer end of the cylinder 189. The bolt device 193 extends through the cap 195 and includes a head 196. By turning the head 196, the enlarged portion 194 and the plunger 190 are separated such that the bifurcated end portion of the plunger frictionally engages the ridge 188. This frictional engagement is sufficient to prevent rotary motion of the portion K' relatively to the column K. When it is desired to raise or lower the portion K', the head 196 is turned to relieve the frictional force between the plunger 190 and the ridge 188. Vertical movement of the portion K' is adapted to be effected by rotation of a screw 197 (Fig. 12) that is in threading engagement with mating threads formed within the body of the portion K'. Referring to Fig. 15, the screw 197 is part of a shaft that is driven by a separate reversible electric motor 198. Energization of the motor 198 will effect vertical reciprocation of the portion K'. When the portion K' has been adjusted to a desired position, the head 196 is turned to position said portion accurately relatively to the column K. This, however, is insufficient to rigidly bind the portion K' to the column and, therefore, the one side of the portion K' is formed with an opening 199 extending throughout its entire length (Fig. 13). The opening 199 is adapted to be closed by a plate 200, the dimensions of which are slightly less than the opening 199. Accordingly, bolting the closure plate 200 between the sides of the opening 199 will, in effect, cause wrapping of the portion K' about the column K and provide sufficient frictional engagement between the two to rigidly maintain the portion K' in adjusted position as though it were integral with the column K. With such an adjustable portion K', it is evident that work of low and high elevation may be machined while still providing adequate support for the tools and avoiding excessive tool overhang.

Figures 17, 18:
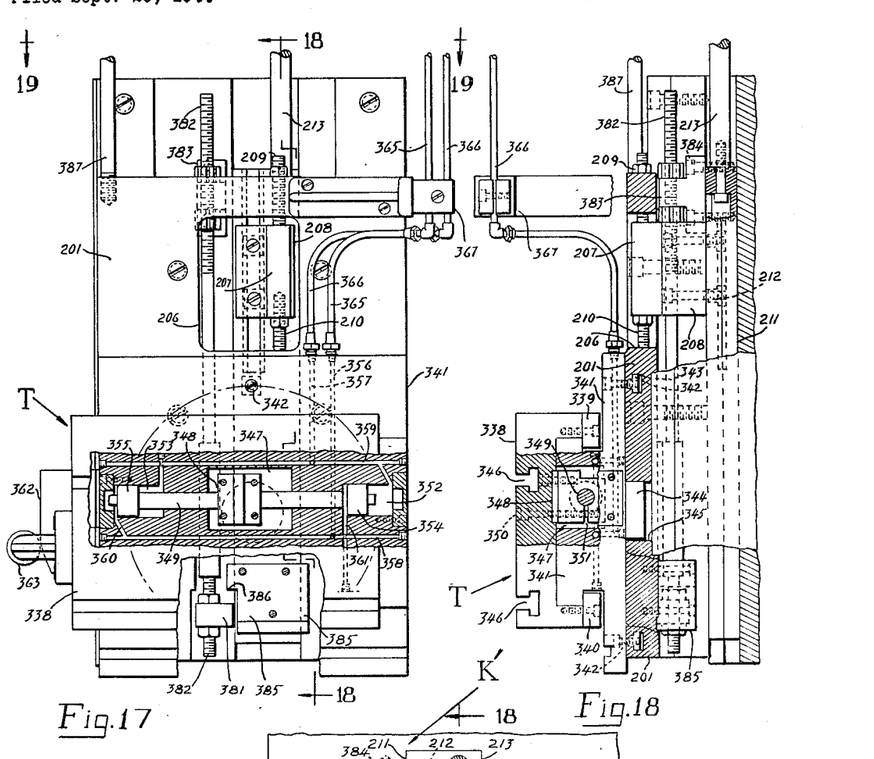
Figure 17 is an enlarged front elevational view of a tool head as viewed along line 17—17 of Fig. 12.
Figure 18 is a sectional elevational view taken substantially along line 18—18 of Fig. 17.
Figure 19:
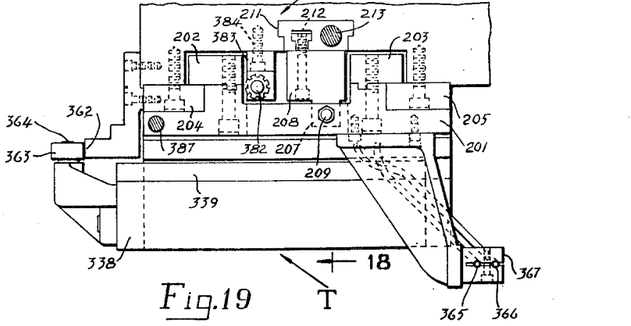
Figure 19 is a top plan view of the apparatus shown in Fig. 17.

The tool slides T may take various forms including plain slides which move vertically only; compound slides which move vertically and horizontally by the movement of a common driving means; and forming heads adapted to move vertically by mechanical means and horizontally by hydraulic means. The present invention employs a novel forming tool slide comprising the third class of tool heads just mentioned. The specific construction of this hydraulic forming tool slide will be described later. Certain parts of the tool head T are common to all heads including a saddle 201. Referring to Figs. 17, 18 and 19, gibs 202 and 203 are bolted to the saddle 201 forming a groove that cooperates with additional gibs 204 and 205 that are rigidly bolted to the face of the adjustable portion K'. The saddle 201 is provided with a recess 206 within which a projection 207 of an adjustable block 208 is adapted to extend. An adjustable screw and lock nut 209 is threaded into the top of the saddle 201, extends into the opening 206, and is adapted to abut against the tongue 207. An additional adjustable screw and lock nut 210 is threaded into the lower surface of the tongue 207 and is adapted to abut the lower surface of the opening 206 within the saddle 201. The block 208 is adapted adjustably to be bolted, by a plurality of T-bolts 212, to an elongated block 211 that is adapted to slide within a groove formed in the surface of the adjustable portion K'. A feed rod 213 is rigidly attached to the top end of the block 211 and extends (Fig. 2) upwardly through the plate 163 and contains a cam follower 214 at its upper extremity. The cam roller 214 is adapted to cooperate with a cam surface 215 formed on the periphery of a feed drum 216. The feed drum 216 is adapted to be rotated at different speeds when specific portions of the cam groove 215 cooperate with the follower 214 for the purpose of moving the tool head T downwardly at traverse and feed rates, and upwardly at a traverse rate. The drum 216 is keyed to a shaft 217 that is journaled in the plate 163 at its lower end and in a bracket 218 at its upper end. The drum 216 has fixed to it a worm gear 219 that is adapted to mesh with a worm 220 (Fig. 8) keyed to a horizontally-disposed shaft 221. Rotation of the shaft 221, therefore, causes the rotation of the feed cam 216 and the consequent vertical movement of the head T. The shaft 221 is adapted to be rotated at relatively slow and relatively fast rates of speed from the main driving gear 176. The shaft 178 includes a worm 222 keyed thereto which meshes with a worm gear 223 keyed to a sleeve 224 journaled on the righthand end of the shaft 221 as viewed in Fig. 8. A flange 225 containing clutch teeth is integral with the end of sleeve 224 opposite that to which worm gear 223 is keyed. A spool clutch 226 having teeth which mate with the clutch teeth on the flange 225 is splined to the shaft 221 and is adapted to be reciprocated by the oscillatable movement of a lever 227 that is pivoted at 228. It is evident that movement of clutch 226 rightwardly into clutching engagement with the flange clutch 225 will cause the shaft 221 to be rotated relatively rapidly through the gear train 176, 177, 222, and 223. This gear train provides the means for rapidly rotating the cam drum 216 to provide rapid traverse movement of the tool head T.

Figures 8, 10, 11:
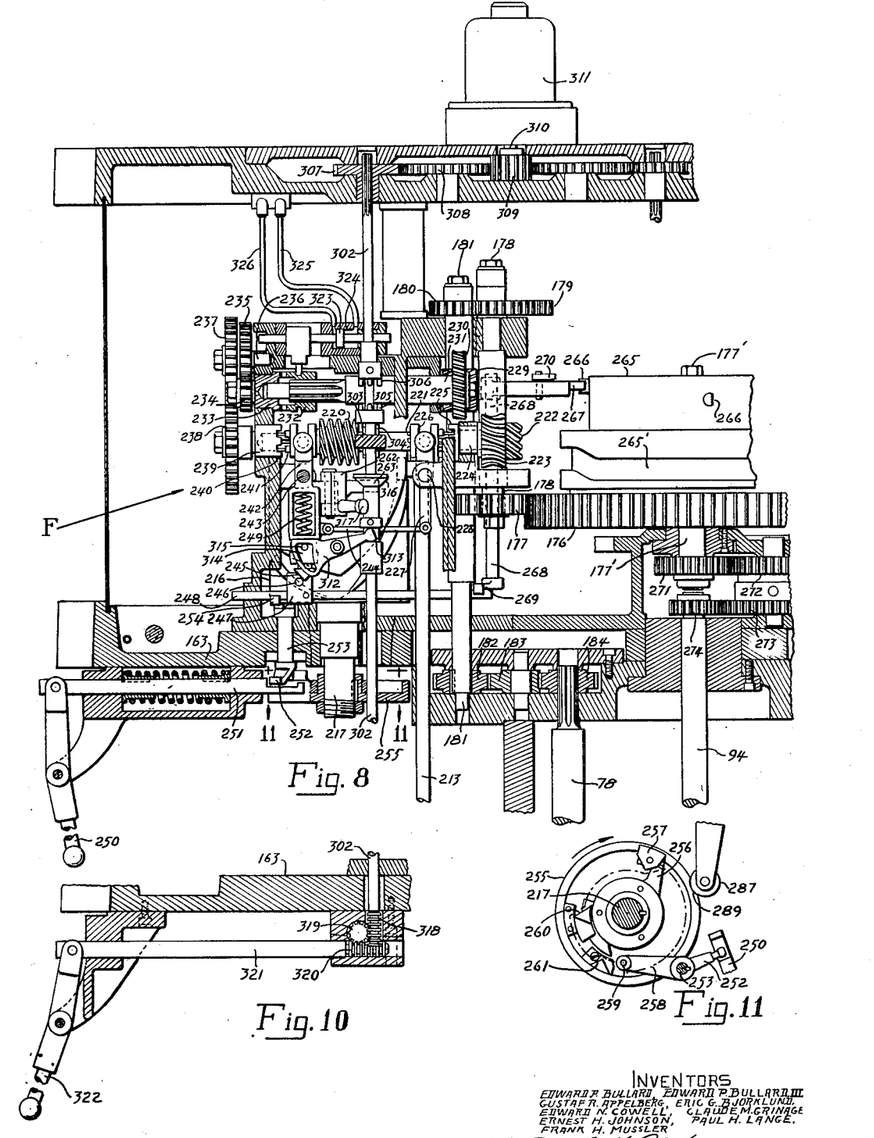
Figure 8 is an enlarged sectional-elevational view of one of the feedworks transmissions shown in Fig. 2.
Figure 10 is a sectional-elevational view taken substantially along line 10—10 of Fig. 9.
Figure 11 is a top plan view of the timing disc taken substantially along line 11—11 of Figs. 2 and 8.

The shaft 181 includes a worm 229 that meshes with a worm wheel 230 keyed to a shaft 231. A spool clutch 232 is splined to the shaft 231 and is adapted upon leftward movement, as viewed in Fig. 8, to mesh with a mating clutch 233 that rigidly supports a spur gear 234. The gear 234 meshes with a gear 235 that is keyed to a shaft 236 to which a gear 237 also is keyed. The gear 237 meshes with a gear 238 keyed to a sleeve 239 containing clutch teeth 240. The lefthand end of shaft 221, as viewed in Fig. 8, is journaled in a recess formed in the sleeve 239 and includes a splined portion on which an additional spool clutch 241 is adapted to be reciprocated. Movement of the spool 241 leftwardly into clutch engagement with the clutch teeth 240 will cause the shaft 221 to be rotated through the gear train including gears 176, 177, 179, 180, 229, 230, 234, 235, 237 and 238. Gears 237 and 238 are pull gears and accordingly, the rate at which the shaft 221 can be rotated through the last-mentioned gear train may be changed at will. This last-mentioned gear train provides the means for rotating the cam drum 216 at relatively slow feed rates and, consequently, provides a relatively slow movement of the tool head T during a machining operation.

Figure 9:
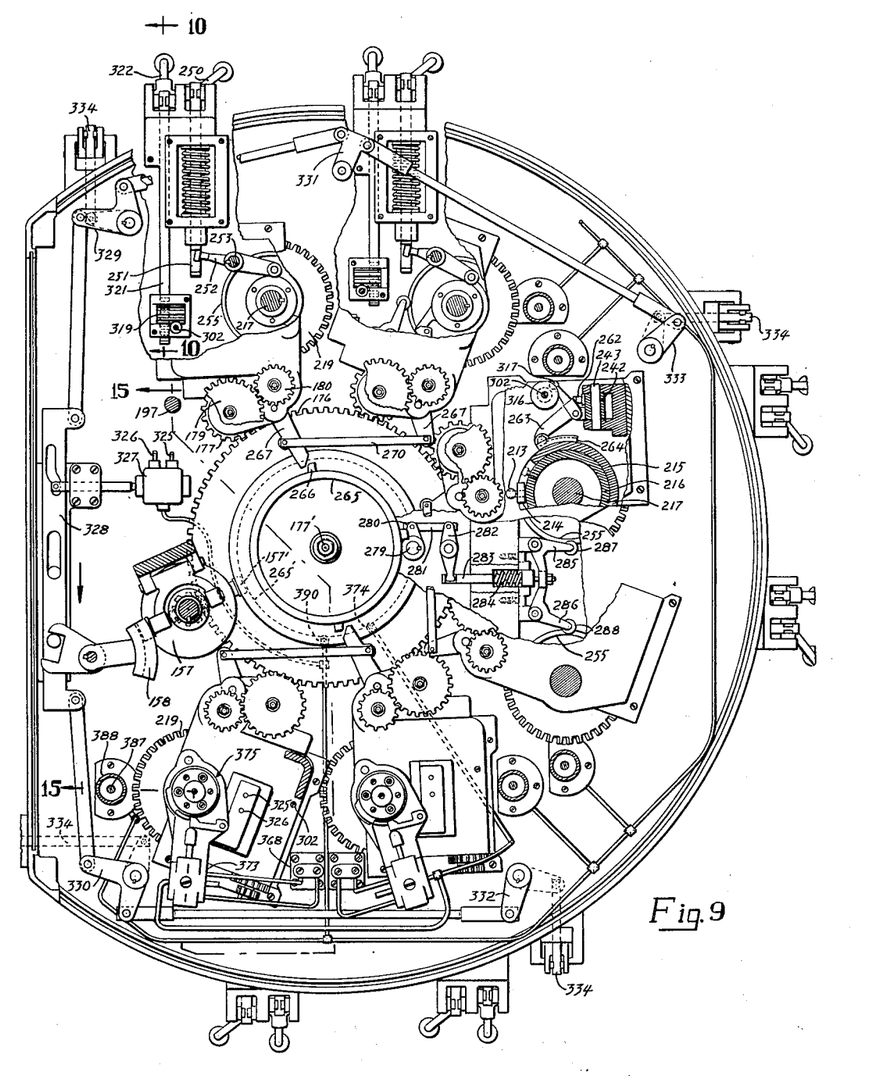
Figure 9 is a plan view taken substantially along line 9—9 of Fig. 2.

The movement of the spool clutch 241 is effected by the oscillatable movement of a lever 242 pivoted at 243 to a stationary bracket. The spool clutch 241 or 226 may be rendered effective individually, but not both at the same time. Accordingly, the operating levers 227 and 242 are connected by a rod 244. Movement of the lever 242, therefore, causes corresponding movement of the lever 227 so that both spools 226 and 241 never become active at the same time. The lower end of the oscillatable lever 242 includes a spring-pressed arrow point 245 that is adapted to cooperate with a pin 246 fixed to a block 247 which latter is keyed to a rod 248. The construction and arrangement of the parts are such that with them in the position shown in Fig. 8, the arrow point 245 is on the right side of the pin 246 and a spring 249 resiliently urges the arrow point 245 downwardly, thereby tending to cause the spool 241 to move into engagement with the teeth 240 and the spool 226 to move away from engagement with the clutch 225. This does not occur because of means which will be described later. Movement of the rod 248 rightwardly, as viewed in Fig. 8, will cause the pin 246 to move to the opposite side of the arrow point 245, whereupon spring 249 will effect movement of spool 241 away from the clutch teeth 240 and movement of the clutch 226 into engagement with the clutch 225. Reciprocable movement of the rod 248 is adapted to be effected manually by the operation of a hand lever 250 that is connected to a rod 251. Rod 251 makes a lost-motion connection with a link 252 integral with a shaft 253 containing a connecting element 254 that engages the rod 248. The operation of the rod 248 is adapted automatically to be controlled to cause the drum 216 to rotate at a rapid traverse rate; a feed rate; and a rapid traverse rate during a complete cycle of operation. The mechanism that automatically controls the operation of rod 248 comprises a timing disc 255. The timing disc 255 is keyed to the lower end of the shaft 217 to which the drum 216 is keyed. Referring to Fig. 11, the timing disc 255 includes an adjustable bracket 256 containing a cam 257. The shaft 253 also includes a lever 258 containing a cam roll 259 that extends into cooperating position relatively to the timing disc 255. Assume the timing disc 255 begins to move in a clockwise direction with the drum 216. The cam roll 259 instantly moves radially outwardly to the dotted line position by means which will be described later. When the cam 259 is in its dotted line position, the pin 246 (Fig. 8) is on the right side of the arrow point 245 which will cause the clutch 226 to become engaged and the drum 216 to be rotated together with the timing disc 255 at a relatively rapid rate in a clockwise direction, as viewed in Fig. 11. When the cam 257 engages the cam roll 259, it forces the roll 259 radially inwardly such that the rod 248 is operated to position the pin 246 on the left side of the arrow head 245, thereby causing clutch 226 to be disengaged and clutch 241 to become engaged, whereupon the drum 216 begins to rotate at a relatively slow rate of speed and, consequently, the head T descends at a relatively slow rate of speed. This slow rate of speed is effective until a cam 260 engages the roll 259 which forces the cam radially outwardly so that the rod 248 is actuated, positioning pin 243 on the right side of the arrow 245, thereby disengaging clutch 241 and engaging clutch 226, causing the cam drum 216 to rotate relatively rapidly. The form of the cam groove 215 during this last relatively rapid rotation of the drum 216 is such that the rod 213 is moved upwardly and consequently the tool head T is raised relatively rapidly. When the head T has arrived at its uppermost position, a third cam 261 engages the cam roll 259, forcing it inwardly, thereby locating the pin 246 on the lefthand side of the arrow 245 tending to move clutch 241 into engagement. However, the pivotable lever 242 includes a bracket 262 that supports an arm 263. Referring to Fig. 9, the arm 263 contains an abutment in alignment with a cam 264 fixed to the outer periphery of the cam drum 216. The elevation of the cam 264 is such that when the head arrives at its uppermost position and the clutch 241 is urged toward clutch engagement position, the abutment on the arm 263 engages the cam 264, preventing this clutch engagement, whereupon the feedworks is maintained in neutral until released by a control that is operated manually at the completion of each indexing movement of the carrier C. Thus, it is evident that the feedworks F automatically controls the movement of the tool head T throughout a cycle of operation at the end of which it is neutralized and is rendered effective manually, only upon the indexing of a succeeding spindle S into line with the head T controlled by the feedworks F.

There is, of course, a separate feedworks transmission F for each tool head T at each working station about the column K. In the present embodiment where two tool heads T are adapted to be employed at each of three working stations, there are six such feedworks transmissions. Each feedworks operates independently of every other. However, upon the completion of the cycle of operation of each, it is neutralized until all others have become neutralized at the completion of their cycles of operation before the carrier C is indexed. Accordingly, a control drum 265 is keyed to the shaft 177' on which gear 176 is journaled. It includes a dog 266 for each work station about the column K. These dogs 266 are located at different elevations so that upon a complete single revolution of the drum 265, each dog will actuate a control lever 267 that is connected to a vertically-disposed shaft 268 of one of the feedworks F at each work station. The shaft 268 is operatively connected to rod 248 by a link 269. The control lever 267 of the other feedworks transmission F at the same station is simultaneously operated with the former, and is connected to the former by a tie rod 270 (Fig. 9). The construction and arrangement of the parts are such that upon a complete revolution of the drum 265 the dogs 266 will oscillate the control lever 267 of each feedworks at each work station to move the rod 248 of each feedworks in a direction to position the pin 246 on the right side of the arrow head 245, as viewed in Fig. 8. This will effect engagement of the clutch 226 of each feedworks and the rapid rotation of the drum 216 thereof, initiating the cycle of operation for each feedworks. The control drum 265, therefore, is caused to make a single revolution during the indexing of the carrier C. Since the shaft 94 makes two revolutions for each indexing movement of the carrier C and the drum 265 is adapted to make a single revolution, a two to one gear reduction is provided between the shaft 94 and the drum 265. This gear reduction includes a spur gear 271 keyed to the lower end of shaft 177' that meshes with a gear 272 integral with a gear 273 which latter meshes with a spur gear 274 on the upper end of a shaft 94.

The drum 265 also includes a cam track 265' that, upon initial rotation of drum 265 during an indexing operation of carrier C, disengages clutch 157 through the action of a follower 157' (Fig. 2) so that the spindles S can be stopped by the brakes 88 at the beginning of the index cycle.

The shaft 94 is adapted to support a portion of the mechanism that is employed to effect engagement between shaft 94 and the continuously-rotating gear 172 when an indexing movement of carrier C is desired. Accordingly, when the gear 172 is connected to the shaft 94, it and shaft 94 rotate through two revolutions during an indexing movement of the carrier C, and control drum 265 rotates through a single revolution. A drum 276 is fixed to the shaft 94 and it contains a dog 277 for each work station about the column K. Each dog 277 is adapted normally to remain in abutting relation with a finger 278 fixed to the lower end of a shaft 279. The shaft 279 (Fig. 9) extends upwardly to the elevation of the timing disc 255 (Fig. 2) and rigidly supports a lever 280 (Fig. 9) that is pinned to a rod 281. The rod 281 is pinned to one end of an oscillatable lever 282, the opposite end of which engages a reciprocable rod 283. Rod 283 is resiliently urged outwardly by a spring 284. It is held inwardly by the action of bell crank levers 285 and 286 for the feedworks at a station. The bell crank levers 285 and 286 include cam rollers 287 and 288 which roll along the periphery of the timing discs 255 at said station. When the cam drums 216 at a station are in position such that their tool heads T are in their uppermost positions, each of the rollers 287 and 288 cooperates with a recess 289 (Fig. 11) on the periphery of its respective timing disc 255. With the rollers 287 and 288 in the recesses 289 of their respective timing discs, the shaft 283 is moved to its outermost position and the shaft 281 is moved to its innermost position thereby moving finger 278 (Figs. 2 and 12) out of abutting relation with its dog 277. At any other time during the cycle of operation of either of the feedworks at each station, the corresponding finger 278 is positively maintained in abutting engagement with the corresponding dog 277 on the drum 276. The drum 276 is resiliently connected to a bracket 290 keyed to the shaft 94 between the drum 276 and the flange 173 to which gear 172 is fixed. A plunger 291 (Fig. 13) within the bracket 290 is adapted to be moved out into one of the slots 174 within the flange 173 upon release of all of the fingers 278 which hold the drum 276 in fixed position prior to an indexing movement of the carrier C. This connection is shown and specifically described in Patent No. 2,259,948, granted to E. P. Bullard, III, on October 21, 1941, to which patent reference is directed for specific features of construction.

As previously described, the carrier C is adapted to be indexed from one station to another when all of the tool heads T have completed their cycle of operation and have moved to their uppermost positions. However, the operator may not have had time to completely load the new work piece at the loading station before all heads have moved to their upper position, in which case should the carrier C automatically index, serious damage would ensue. Accordingly, a safety device is employed for preventing the automatic indexing of the carrier C upon the release of all fingers 278. This safety device comprises an additional lug 292 on the drum 276. A bell crank 293 fixed to a shaft 293' includes an arm 294 that is adapted to be moved into and out of abutting relation with the dog 292. Another arm 295 of the bell crank 293 is fixed to a reciprocable rod 296 that is connected to a pivotally-mounted lever 297 (Fig. 2). The lever 297 is connected to one end of an oscillatable shaft 298 to the other end of which an operating rod 299 is attached. The rod 299 is provided with a handle portion 300 conveniently located at the loading station of the machine. The rod 299 is provided with a counter-balancing weight 301 that normally holds it in position such that the arm 294 (Fig. 12) is in abutting relation relatively to the dog 292. Accordingly, when all the heads T have moved to their uppermost positions releasing all of the fingers 278, the carrier C will not be automatically indexed, but depends upon the operator pulling the handle 300 downwardly.

During the setting of the tools on the heads T for performing operations on the work, it is often necessary to cause a jogging motion of the heads T under the control of the operator. This feature is incorporated in the present structure and comprises a vertically-disposed shaft 302 (Fig. 8) on which a sleeve is journaled that has a worm 303 keyed to it. The worm 303 meshes with a worm gear 304 fixed to shaft 221. A clutch 305 is formed integrally with the sleeve supporting the worm 303 and it is adapted to be meshed with a clutch 306 that is pinned to the shaft 302. The shaft 302 extends upwardly through the top of the machine frame and is splined to a spur gear 307. The gear 307 meshes with a gear 308 which in turn meshes with a pinion 309 fixed to a shaft 310 of a motor 311. There are additional gears 308 and 307, together with additional shafts 302, one set for each feedworks transmission F of the machine. From the foregoing, it is evident that the motor 311 causes the continuous rotation of the shafts 302 for each of the feedworks transmissions. Downward movement of the shaft 302 will cause the clutch 306 to engage the clutch 305, whereupon the worm 303 will drive shaft 221 and effect rotation of the cam drum 216. This must occur, however, only when the clutches 241 and 226 are in neutral. Accordingly, a pivoted lever 312 has its one end in cooperation with a spool 313 fixed to the shaft 302. The opposite end of the pivoted lever 312 includes a cam slot 314 that cooperates with a pin 315 on the pivoted lever 242. The construction and arrangement of parts are such that downward movement of the shaft 302 will cause upward movement of the cam slot 314 such that the pin 315 will be maintained in a position where clutches 241 and 226 are in neutral. The motor 311 is reversible and, therefore, the operator may cause rotation of the cam drum 216 in either direction. Referring to Fig. 9, the arm 263 that cooperates with the cam 264 is so designed that when it is in cooperating position, reverse movement of the feed drum 216 will cause damage to either the cam 264 or the arm 263. Accordingly, when the jogging mechanism is employed, arm 263 must be removed from the path of travel of the cam 264. This is accomplished by providing a cam 316 (Fig. 8) on the shaft 302 that cooperates with a follower 317 fixed to the bracket 262 that supports the arm 263. The construction and arrangement of the parts are such that downward movement of the shaft 302 will cause cam 316 to cooperate with follower 317, thereby moving arm 263 (Fig. 9) from the path of travel of the cam 264.

The lower end of shaft 302 is provided with rack teeth 318 (Fig. 10) that mesh with a pinion 319. The pinion 319 also meshes with rack teeth 320 on a horizontally-disposed shaft 321. The shaft 321 has an operating lever 322 fixed to its outer extremity such that movement thereof by the operator will effect downward or upward movement of the shaft 302.

The use of carbide tipped tools necessitates an accurate control between the rotation of the work and the movement of the tool heads T. Particularly is this necessary when a feeding cut is being made and it is desired to stop the machine. The feeding of the tool should be interrupted before stopping the rotation of the work to permit the tool to clean up the work and relieve the tool of all pressure before the rotation of the work stops. If this is not done, the tool tip will remain buried in the work when the work stops, causing disastrous results to the carbide tip.

Referring to Fig. 8, the clutch 232 is adapted to be moved into and out of clutching engagement with the clutch element 233 by the operation of a piston 323 that is adapted to be reciprocated within a cylinder 324. Fluid under pressure is adapted to be supplied to opposite sides of the piston 323 by conduits 325 and 326. The conduits 325 and 326 are connected to a valve 327 (Fig. 9) that is adapted to be operated by the reciprocable movement of a member 328. The movement of member 328 also effects the operation of cam 158 that controls the operation of the main clutch 157. With the parts arranged in the position shown in Fig. 9, the valve 327 is in position whereby the clutch 232 is engaged by the clutch 233 and the main clutch 157 is also engaged so that a cutting operation is being performed. Movement of the member 328 in the direction of the arrow as shown in Fig. 9, will cause the valve 327 to be operated to disengage clutch 232 from clutch 233 while still maintaining engagement of the main clutch 157 and, consequently, continued rotation of the work spindles S. Continued movement of the member 328 in the direction of the arrow will cause disengagement of main clutch 157 without affecting the disengaged condition of clutch 332, all as more fully shown, described and claimed in Patent No. 2,385,605, granted September 25, 1945 to Edward P. Bullard, III, et al. The member 328 is connected to oscillatable levers 329, 330, 331, 332 and 333. The construction and arrangement of the parts are such that movement of hand levers 334, connected at selected points about the linkage including the members 329, 330, 331, 332 and 333, will cause operation of member 328 to start or stop the rotation of the work supports S and the feed of the tool heads T in the desired order.

Figure 14:
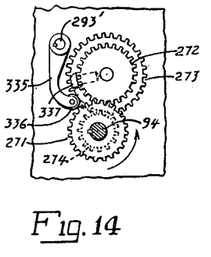
Figure 14 is a top plan view taken substantially along line 14—14 of Fig. 2.

An additional safety feature is provided for preventing the accidental double indexing of the carrier C should the hand lever 300 (Fig. 2) be inadvertently held in a downward position for too great a length of time. The shaft 293' which supports the bell crank lever 293 extends upwardly through the plate 163 to the elevation of the gear cluster 272, 273. An oscillatable lever 335 (Fig. 14) is keyed to the shaft 293' and it includes a roller 336 that is adapted to be engaged by a dog 337 fixed to the top of gear 273. The construction of the parts is such that when the hand lever 300 is in its lower position, thereby permitting indexing of the carrier C, the roller 336 is moved into the path of the dog 337. Accordingly, should the hand lever 300 inadvertently be held in its low position for too great a length of time, the dog 337 will oscillate the shaft 293', thereby forcing the arm 293 into abutting relation with the dog 292 on the drum 276, thereby insuring a single index of the carrier C.

Referring to Figs. 17, 18 and 19, the tool support T includes a cross slide 338 provided with gibs 339 and 340 that maintain it in operative engagement with a swivel 341. The swivel 341 is provided with a series of square headed bolts 342 that ride within an arcuate groove 343 formed in the outer surface of the saddle 201. The swivel is provided with a centrally-disposed boss 344 that is journaled in an opening 345 centrally located on the saddle 201 relatively to the arcuate groove 343.

The outer face of the cross slide 338 includes the usual clamping slots 346 for facilitating attachment of the cutting tool thereto. In the present embodiment of the invention, the tool slide T takes the form of a forming attachment that is adapted to be moved throughout a compound motion including vertically-downward and horizontally-inward movement. The vertically-downward movement of the tool head T is provided by the rotation of the feed cam 215 through the action of the roll 214 and the movement of the feed rod 213. The horizontally-inward movement of the tool slide T is adapted to be caused by hydraulic means in combination with a forming cam.

The front face of the swivel 341 is provided with a recess 347 within which a clamping block 348 extends that is fixed to the back face of the tool slide 338. The clamping block 348 surrounds a connecting rod 349 to which it is frictionally engaged by elongated screws 350. The screws 350 extend from the outer surface of the slide 338 through the block 348 across an opening 351 in such manner that tightening of the screws 350 extend from the outer surface of the the piston rod 349. However, the gripping action is not so great but that it will yield in an emergency should an excessive force be encountered by the tool.

The swivel 341 is provided with spaced cylinders 352 and 353 (Fig. 17). The rod 349 extends into the cylinders 352 and 353 and is provided with pistons 354, 355 which act in tandem. Drilled passages 356 and 357 within the swivel 341 communicate with conduits 358 and 359. The conduit 358 communicates with ducts 360 and 361 which are in communication with the left-hand ends of cylinders 353 and 352, respectively. The conduit 359 is in communication with the right-hand ends of cylinders 353 and 352. The construction and arrangement of the parts are such that flow of fluid under pressure through the line 356 causes the cross slide 338 to move rightwardly, as viewed in Fig. 17, and admission of fluid under pressure through the line 357 causes leftward movement of the cross slide 338. The horizontal movement of the cross slide 338 is adapted to be controlled by a cam 362 that is rigidly secured to the adjustable portion K' of the column K. A cam roll 363 journaled on a stud 364 rigidly fixed to the cross slide 338 is adapted to cooperate with the cam 362 to control the horizontal movement of the cross slide 338.

The conduits 356 and 357 are joined to pipes 365 and 366 which extend upwardly through a bracket 367 rigidly attached to the saddle 201. The lines 365 and 366 are adapted to telescope into a manifold 368 (Fig. 15) mounted on the upper surface of the plate 163. The manifold 368 includes two chambers 369 and 370, each adapted to be supplied with fluid from conduits 371, 372, respectively. The conduits 371 and 372 are in communication with a valve 373 that is supplied with liquid under pressure through a supply conduit 374 that is connected to line 129 leading from pump 131 (Fig. 3). The valve 373 is adapted selectively to be operated for controlling the admission of liquid under pressure to the manifold 368 by a cam device 375 that is associated with the top of the shaft 217 to which the feedworks cam is attached. Referring to Fig. 16, the valve 373 is provided with a stem 376 that abuts against a pivotally-mounted lever 377. The lever 377 is in cooperative position relatively to the cam device 375. The cam device 375 includes two segments 378 and 379 that are adapted to be adjusted relatively to each other to vary the extent of its effectiveness during a single revolution of shaft 217. By providing the two independent segments 378, 379 which are adapted to overlap each other, it is evident that valve 373 can be operated during a relatively small, or relatively large portion of a single revolution of the shaft 217. The position of the cams 378 and 379 relatively to the cam path 215 on the cam drum 216 is such that the total vertically-downward feed, as well as inward feed, must be completed when the roll 214 arrives at the lowest portion of the cam track 215. This can effectively be accomplished by adjusting the cams 378, 379 through the screws 380. In operation, the initial traverse movement of the feed rod 213 downwardly will occur until the cam 257 (Fig. 11) causes rod 213 to be moved downwardly at a desired feed rate. At this time, the combination of cams 378 and 379 moves the pivot 377 so as to operate the stem 376 to cause valve 373 to supply liquid under pressure through the line 356, thereby moving the pistons 354, 355 and with them the cross slide 358 rightwardly, as viewed in Fig. 17, until the roll 363 engages the cam 362. This transfer from traverse to feed and the initiation of the operation of the valve 373 must only occur when the roll 363 is within the effective extent of the cam 362. Continued downward movement of the feed rod 213 at a feed rate causes the tool holder T to be moved both downwardly and inwardly as dictated by the contour of the cam 362. When the cam roller 214 (Fig. 2) arrives at the lower portion of the travel of the cam path 215 on the cam drum 216, the cam 260 (Fig. 11) in the timing disc operates the feedworks to return the feed rod 213 upwardly at a relatively fast rate of traverse speed. Simultaneously, the cams 378, 379 operate valve 373 to exhaust the line 365 and supply liquid under pressure to the line 366 which moves the cross slide 338 leftwardly as viewed in Fig. 17, during the upward traverse movement of the head T. The bottom of the feed cam path 215 determines the limit of the tool action. However, there is a slight backlash between the cam and the cam roller 214 which will not give an exactly accurate limit to the tool movement. When it is desired to very accurately limit the extent of tool action, a lug 381 is adapted adjustably to be secured to the end of a threaded rod 382 that is fixed to a plate 383 rigidly attached to the portion K' through the bolts 384. A plate 385, rigidly secured to the saddle 201, is provided with an abutment 386 (Fig. 17) that overlies the lug 381. The construction and arrangement of the parts are such that the lug 381 is adjusted to contact the abutment 386 when the tool is at the exact end of the desired cutting action. Accordingly, the end of the cut occurs only when the abutment 386 engages the positive stop 381, thereby accurately locating the tool.

Referring to Fig. 15, the saddle 201 is connected to a counter balance rod 387 that extends upwardly through the plate 163 into a cylinder 388. The upper end of the rod 387 is provided with a piston 389 that is adapted to be reciprocated within the cylinder 388. Liquid under pressure is adapted to be supplied to the cylinder 388 beneath the piston 389 through a conduit 390 that extends vertically downwardly through the column K, and which is connected to the relief valve 126 that is supplied with liquid under pressure from the pump 124. The cylinder 388 is provided with a vent 391 at its upper end for exhausting the space above the piston 389. The construction and arrangement of parts are such that the relief valve 126 maintains the pressure within the line 390 sufficient to balance the weight of the elements including the tool head T, swivel 341 and saddle 201. Movement of the saddle 201 downwardly causes the liquid within the cylinder 388 beneath the piston 389 to pass downwardly through the conduit 390. Any excess liquid within the conduit 390 is exhausted through the relief valve 126. Vertically upward movement of the saddle 201 causes the air above the piston 389 to exhaust through the vent 391.

An additional relief valve 392 is connected to the valve 126. A conduit 393 leading from the relief valve 392 extends upwardly through the column K for supplying lubricant to various parts of the machine tool.

Although the various features of the new and improved machine tool have been shown and described in detail to fully disclose one embodiment of the invention, it will be evident that numerous changes may be made in such details without departing from the principles of the invention.

What is claimed is:

1. Apparatus comprising in combination, a vertically-disposed column; a carrier adapted to be indexed from station to station about said coloumn; tapered bearing surfaces between said carrier and column decreasing in diameter downwardly; a plurality of vertically-disposed work-supporting spindles journaled in said carrier; tool supports located at a plurality of said stations and above said spindles; means for causing said tool supports to be moved downwardly toward said work-supporting spindles for operating on work; means for locating said carrier when it arrives at any of said stations; an abutment; and means for rigidly holding said carrier at each of said stations and adapted to act upwardly on said carrier and in opposition to the force incident to said work operations, thereby forcing said carrier into contact with said abutment.

2. Apparatus comprising in combination, a vertically-disposed column; a carrier journaled on said column and adapted to be indexed from station to station about said column; tapered bearing surfaces between said carrier and column decreasing in diameter downwardly; a plurality of vertically-disposed work-supporting spindles journaled in said carrier; tool supports located at a plurality of said stations and above said spindles; means for causing said tool supports to be moved downwardly toward said work-supporting spindles for operating on work; an abutment; and fluid-pressure means adapted to operate on said carrier at spaced intervals in opposition to its weight and the force incident to said work operation, thereby forcing said carrier into contact with said abutment.

3. Apparatus comprising in combination, a column; a carrier journaled on said column and adapted to be indexed from station to station about said column; means for locating said carrier when it arrives at any of said stations; a plurality of work-supporting spindles journaled in said carrier; tool supports located at a plurality of said stations; means for causing said tool supports to be moved toward said work-supporting spindles for operating on work; tapered journal surfaces between said column and carrier; an abutment; and fluid-pressure means including a plurality of binding pistons spaced about said carrier and adapted to act on said carrier in opposition to its weight whereby the clearance between said tapered surfaces is reduced to prevent chattering during a working operation at any of said stations, and said carrier is forced into contact with said abutment.

4. Apparatus comprising in combination, a column; a carrier journaled on said column and adapted to be indexed from station to station about said column; a plurality of work-supporting spindles journaled in said carrier; tool supports located at a plurality of said stations; means for causing said tool supports to be moved toward said work-supporting spindles for operating on work; hydraulic chucking mechanism for each spindle; tapered journal surfaces between said column and carrier; oil grooves between said tapered surfaces for supplying oil under pressure to said chucking mechanism; and fluid-pressure means including a plurality of binding pistons spaced about said carrier and adapted to act on said carrier to rigidly hold it at each of its stations and in such manner that the clearance between said tapered surfaces is reduced to prevent leakage of oil from said grooves and chattering of said carrier during a working operation at any of said stations.

5. In a machine tool, a carrier; means for indexing said carrier from station to station about a central axis; a plurality of work-supporting spindles arranged in a circle about said carrier; tool holders located at each of a plurality of said stations and adapted to be moved toward and from said spindles; individual automatically-controlled drive means for moving said tool holders and for rotating the spindles at each of a plurality of said stations; means for accurately locating said carrier upon the completion of each indexing movement thereof; mechanically-controlled, fluid-operated mechanism at a loading station of said machine tool for rotating each spindle when it is in said loading station; a pivotal member for simultaneously rendering effective said locating means and said fluid-operated mechanism; and fluid-operated means for operating said pivotal member in timed relation to the indexing of said carrier.

6. Apparatus comprising in combination, a carrier; a column on which said carrier is journaled; a plurality of work-supporting spindles arranged on said carrier in a circle about said column; tool holders located at a plurality of stations about said column; a loading station; separate automatically-controlled drive means for moving said tool holders and for rotating the spindles at the stations containing said tool holders; separate manually-controlled fluid-operated drive means for rotating said spindles when they are at said loading station; means for indexing said carrier from station to station; means for accurately locating said carrier upon the completion of each indexing movement thereof; fluid-operated means for binding said carrier at each station to which it is indexed; a pivotal member for simultaneously rendering effective said locating means and said fluid-operated drive means and means associated with said indexing means for operating said pivotal member and said fluid-operated binding means in timed relation relatively to the indexing of said carrier.

7. A machine tool comprising in combination, a column; a carrier journaled in said column; a plurality of work-supporting spindles journaled in said carrier and arranged in a circle about said column; a member slidable on said column and provided with substantially plain faces forming stations about said column; tool-supporting means on said member at a plurality of said stations; tool supports including hydraulically-operated contouring means adapted to be attached to said tool supporting means; means for moving said member independently of said tool supports; a plurality of feed works transmissions at each of a plurality of said stations for controlling separate tool supports at said stations, one of said feedworks at each of said stations being adapted to rotate the work-support at that station; dual-range spindle driving mechanism within said carrier adjacent each spindle; means for indexing said carrier from station to station; hydraulically-operated locating and binding means for accurately locating and rigidly holding said carrier at each of its index positions; a manually-controlled auxiliary work-support drive mechanism at one of said stations; and means associated with said indexing mechanism for operating said locating and binding means and for rendering effective said auxiliary drive mechanism in timed relation relatively to the indexing of said carrier.

EDWARD P. BULLARD.
EDWARD P. BULLARD, III.
GUSTAF R. APPELBERG.
ERIC G. BJORKLUND.
EDWARD N. COWELL.
CLAUDE M. GRINAGE.
ERNEST H. JOHNSON.
PAUL H. LANGE.
FRANK H. MUSSLER.

REFERENCES CITED

The following references are of record in the file of this patent:

UNITED STATES PATENTS

| Number | Name | Date |
| --- | --- | --- |
| 809,594 | Widmer-Abegg | Jan. 9, 1906 |
| 969,268 | Gowing | Sept. 6, 1910 |
| 1,140,299 | Conradson | May 18, 1915 |
| 1,285,019 | Bullard, Jr. et al. | Nov. 19, 1918 |
| 1,305,473 | Lawrence | June 3, 1919 |
| 1,360,175 | Bullard, Jr. | Nov. 23, 1920 |
| 1,382,339 | Bullard, Jr. | June 21, 1921 |
| 1,449,463 | Hamersveldt et al. | Mar. 27, 1923 |
| 1,449,465 | Van Hamersveld | Mar. 27, 1923 |
| 1,496,794 | Van Hamersveld | June 10, 1924 |
| 1,586,066 | Bullard, Jr. | May 25, 1926 |
| 1,664,374 | Daniels | Mar. 27, 1928 |
| 1,690,567 | Bullard, Jr. | Nov. 6, 1928 |
| 1,715,896 | Bullard, Jr. | June 4, 1929 |
| 1,749,374 | Bullard, Jr. | Mar. 4, 1930 |
| 1,804,971 | Bullard, Jr. | May 12, 1931 |
| 1,924,594 | Blood et al. | Aug. 29, 1933 |
| 2,085,692 | Bullard, 3rd. | June 29, 1937 |
| 2,086,846 | Bullard | July 13, 1937 |
| 2,086,847 | Bullard et al. | July 13, 1937 |
| 2,086,852 | Bullard et al. | July 13, 1937 |
| 2,118,020 | Curtis | May 17, 1938 |
| 2,140,019 | Lewis | Dec. 13, 1938 |
| 2,156,153 | Groene et al. | Apr. 25, 1939 |
| 2,338,975 | Schumacher | Jan. 11, 1944 |
| 2,392,169 | Mansfield | Jan. 1, 1946 |

Certificate of Correction

Patent No. 2,540,186 February 6, 1951

EDWARD P. BULLARD ET AL.

It is hereby certified that error appears in the printed specification of the above numbered patent requiring correction as follows:

Column 18, line 9, strike out the words "extend from the outer surface of the" and insert instead *effectively clamps the block 348 to*; and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*